US008938712B2

United States Patent
Bostian et al.

(10) Patent No.: US 8,938,712 B2
(45) Date of Patent: Jan. 20, 2015

(54) CROSS-PLATFORM VIRTUAL MACHINE AND METHOD

(75) Inventors: Joseph A. Bostian, Red Hook, NY (US); Christopher B. Larsson, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 13/335,500

(22) Filed: Dec. 22, 2011

(65) Prior Publication Data

US 2013/0167112 A1    Jun. 27, 2013

(51) Int. Cl.
*G06F 9/44*    (2006.01)

(52) U.S. Cl.
USPC .......................................... 717/106

(58) Field of Classification Search
CPC .......................................... G06F 8/47
USPC .......................................... 717/106
See application file for complete search history.

(56) References Cited

U.S. PATENT DOCUMENTS

| | | | |
|---|---|---|---|
| 7,088,995 B2 | 8/2006 | Rao | |
| 7,340,718 B2 | 3/2008 | Szladovics et al. | |
| 7,707,551 B2* | 4/2010 | Kelley et al. | 717/121 |
| 7,970,944 B2 | 6/2011 | Pena et al. | |
| 2002/0080200 A1 | 6/2002 | Wong et al. | |
| 2004/0237083 A1* | 11/2004 | Alcazar et al. | 717/178 |
| 2005/0138606 A1* | 6/2005 | Basu et al. | 717/136 |
| 2005/0289508 A1* | 12/2005 | Illowsky et al. | 717/106 |
| 2007/0050704 A1 | 3/2007 | Liu | |
| 2007/0192329 A1* | 8/2007 | Croft et al. | 707/10 |
| 2009/0228838 A1* | 9/2009 | Ryan et al. | 715/853 |
| 2009/0254610 A1 | 10/2009 | Arthursson | |
| 2009/0260006 A1 | 10/2009 | Hotra | |
| 2009/0300578 A1* | 12/2009 | Neil | 717/104 |
| 2010/0011338 A1* | 1/2010 | Lewis | 717/105 |
| 2010/0058290 A1* | 3/2010 | Williamson | 717/106 |
| 2010/0100591 A1 | 4/2010 | Mahaffey et al. | |
| 2010/0180269 A1* | 7/2010 | Stall et al. | 717/151 |
| 2010/0229151 A1* | 9/2010 | Yuan et al. | 717/104 |
| 2013/0167112 A1* | 6/2013 | Bostian et al. | 717/106 |

OTHER PUBLICATIONS

Prus, Boost Reference, boost.org (2009) retrieved from http://www.boost.org/doc/libs/1_55_0/doc/html/bbv2/reference.html on Mar. 9, 2014.*

* cited by examiner

*Primary Examiner* — Don Wong
*Assistant Examiner* — Theodore Hebert
(74) *Attorney, Agent, or Firm* — Cantor Colburn LLP; William A. Kinnaman, Jr.

(57) ABSTRACT

A system includes a virtual source code specification corresponding to no particular platform and at least one transform mechanism corresponding to a particular platform and configured to be applied to the virtual source code specification to generate a source code corresponding to the particular platform.

20 Claims, 8 Drawing Sheets

CROSS-PLATFORM VIRTUAL MACHINE AND METHOD

BACKGROUND

The present invention relates to a virtual machine, and more specifically, to a source-level virtual machine that is used to generate executable applications on any number of separate high-level platforms, and a method for generating the executable applications on the high-level platforms.

Personal computers, cellular phones, laptop computers, tablet PCs, media devices, gaming consoles, and other electronic devices are all examples of hardware that may run software applications. Each type of electronic device may include an software resources, such as an operating system, and hardware resources particular to the device that are available to software applications designed to run on the device. A group of software and/or hardware resources available to applications is generally referred to as a platform, and software applications are designed to run on particular platforms by utilizing the resources of the platform.

SUMMARY

According to one embodiment of the present invention, a computer program product comprises a virtual source code specification to interact, respectively, with a plurality of transform mechanisms, each transform mechanism corresponding to a different platform, to generate a plurality of target source codes corresponding respectively to each platform of the plurality of transform mechanisms.

According to another embodiment of the present invention, a method of generating code includes generating a transform mechanism corresponding to a particular platform, and applying the transform mechanism to a virtual source code specification that does not correspond to the particular platform to generate a target source code corresponding to the particular platform.

According to another embodiment of the present invention, a method of generating code includes receiving a transform mechanism corresponding to a particular platform, and applying the transform mechanism to a virtual source code specification that does not correspond to the particular platform to generate a target source code corresponding to the particular platform.

According to another embodiment of the present invention, a system comprises a virtual source code specification corresponding to no particular platform, and at least one transform mechanism corresponding to a particular platform and configured to be applied to the virtual source code specification to generate a high-level source code corresponding to the particular platform.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Although some aspects of the present invention may be carried out in object oriented programming languages, such as C, other aspects may not be carried out in C, and are instead carried out in source code, such as XML.

Typical platforms include hardware architecture and software to run applications on the hardware architecture. Examples of platforms include personal computers and corresponding operating systems (Mac OS, Windows, Linux, Java, .NET), portable media devices including portable music players, portable video players, mobile phones, laptop computers, tablet computers, and gaming consoles, each with respective software to provide platforms for applications to run on the hardware. Although some examples of hardware, software, and platforms are provided, the present invention may be implemented with any type of computing platform.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
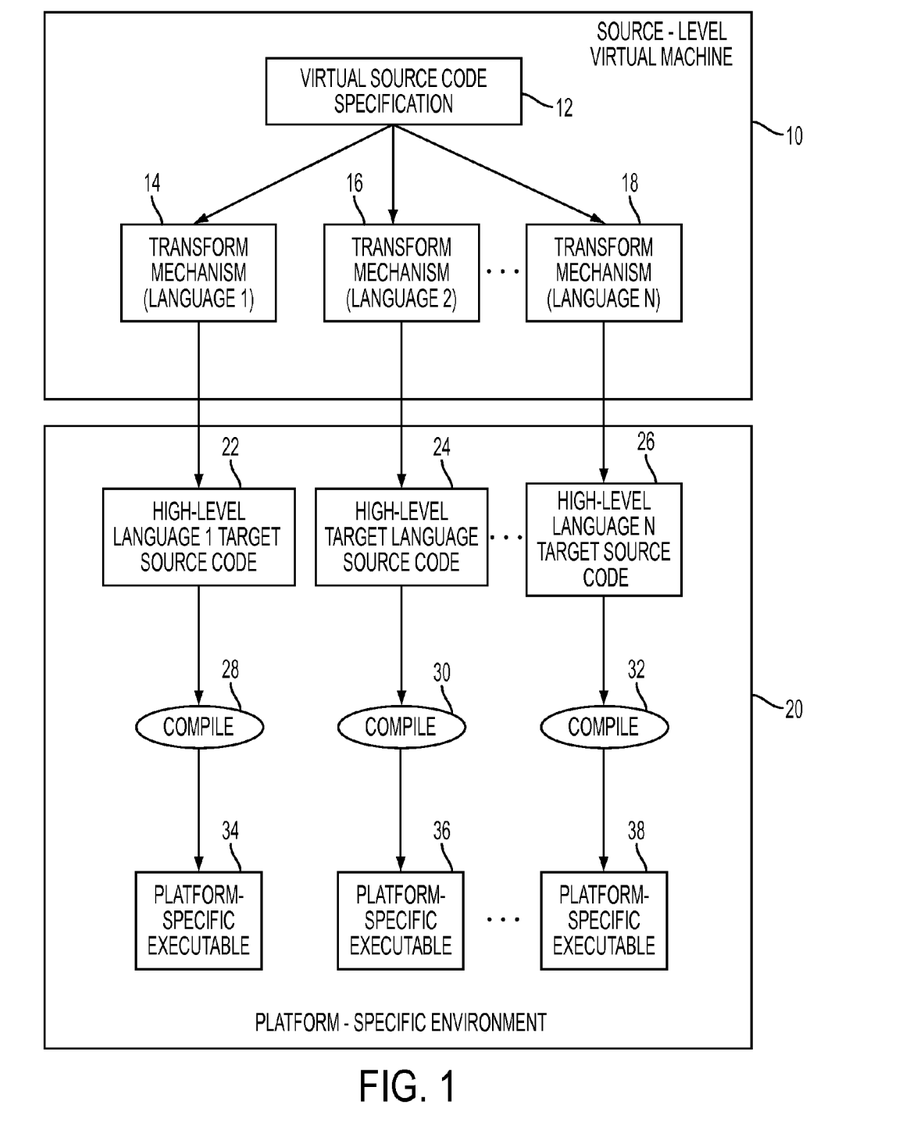
FIG. 1 depicts a system to generate platform-specific executable programs according to an embodiment of the present invention.

Referring to FIG. 1, a system to generate a platform-specific executable application with a source-level virtual machine includes a source-level virtual machine 10 and a platform-specific environment 20.

The source-level virtual machine 10 includes an abstraction of a platform, or a virtual platform, including virtual hardware and a virtual operating system, that defines interfaces and resources available to an application or class of applications. In one embodiment the virtual source code specification 12 is a state machine including one or more states that act on an input stream of data to produce an output stream. The state machine includes virtual instructions to be executed on the virtual interfaces and resources of the source-level virtual machine 10. In one embodiment, the virtual source code specification 12 is a generic markup language document, such as an XML document.

In the present specification and claims, the term "virtual" refers to rules and definitions defined in software that interact with other software to represent actual interfaces and resources. For example, if an actual resource would provide a particular input to a software application in response to a particular event, the source-level virtual machine 10 may include instructions to provide that particular input to the virtual source code specification 12 when the particular event occurs, and the virtual source code specification 12 may include instructions that are executed in response to the input.

One or more transform mechanisms 14, 16, and 18 may be applied to the virtual source code specification 12. The virtual source code specification 12 may be a platform-neutral application. Each separate transform mechanism 14, 16, and 18 may correspond to a different high-level source code, and the number and type of different high-level source codes is not limited by the virtual source code specification 12, since the virtual source code specification 12 is written to be platform-neutral, or to correspond to no one particular platform. In the embodiment in which the virtual source code specification 12 is a generic markup language document, such as XML, each of the transform mechanisms 14, 16, and 18 may be an instruction set applied to the generic markup language document. One example of an instruction set is an XSL style sheet that is applied to the XML document to generate a high-level language target source code 22, 24, or 26.

Applying transform mechanisms 14, 16, and 18 to the same virtual source code specification results in high-level target source code 22, 24, and 26, each high-level target source code corresponding to a different high-level target language (language 1, language 2, language N) and/or target platform. Each set of high-level target source code 22, 24, and 26 is compiled by a compiler 28, 30, and 32 corresponding to the respective target language 1, language 2, or language N. The resulting executable applications (or "executables") are specific to a particular platform associated with the respective language 1, language 2, or language N.

Although FIG. 1 illustrates each high-level target source code 22, 24, and 26 corresponding to a different language and platform, it is understood that some languages may be implemented on a plurality of platforms, and some platforms may operate based on a plurality of different languages.

Figure 2:
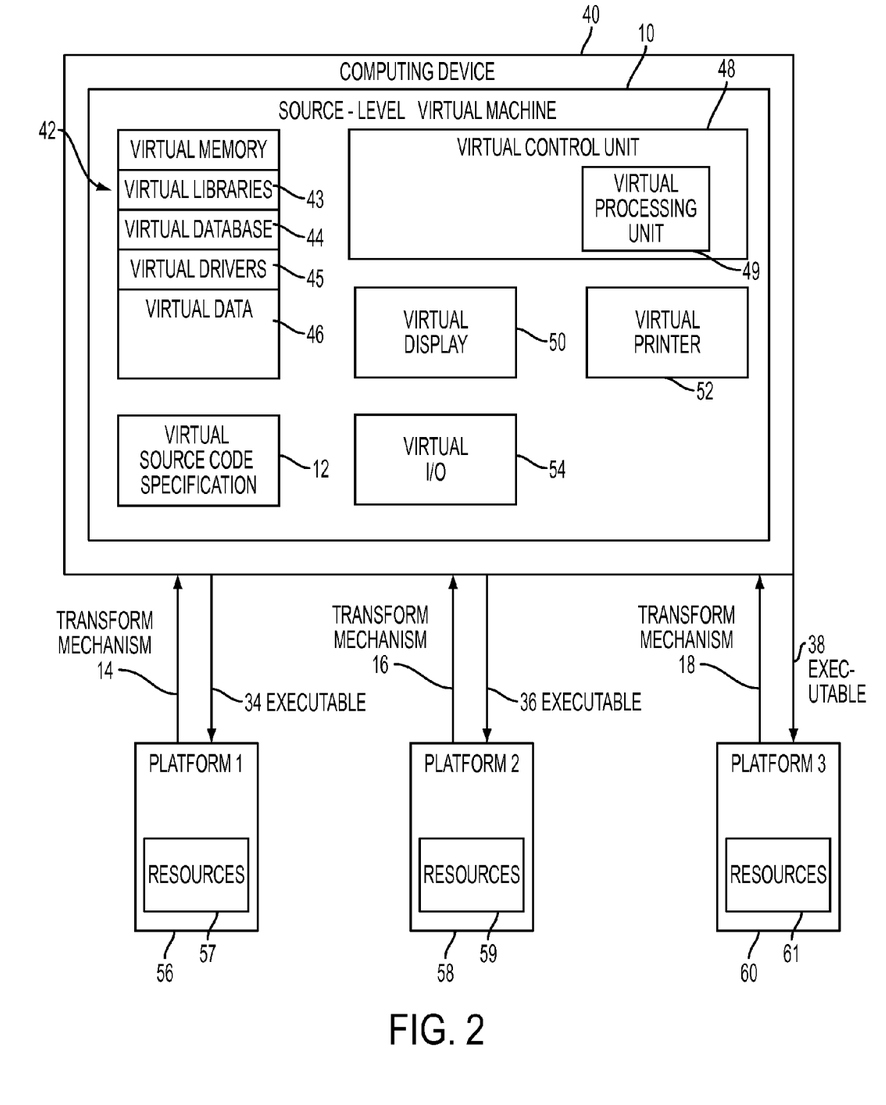
FIG. 2 depicts a block diagram of a system to generate platform-specific executable programs according to an embodiment of the present invention.

FIG. 2 illustrates an implementation of a virtual source-level virtual machine 10 according to one embodiment of the present invention. The source-level virtual machine 10 is stored on a computing device 40. The computing device 40 may have any operating system, and the operating system of the computing device 40 may either be related to an operating system represented by the source-level virtual machine 10 or one of the platforms 56, 58, or 60. Alternatively, the operating system of the computing device 40 may be unrelated to the operating system represented by the source-level virtual machine 10 or the platforms 56, 58, or 60.

The source-level virtual machine 10 defines interfaces and resources available to applications, such as the virtual source code specification 12. Each of the interfaces and resources defined by the virtual source code specification is "virtual," since it represents actual resources available to an executable application, but is not an actual resource available to an actual executable application. Examples of interfaces and resources include virtual memory 42 including virtual libraries 43, virtual databases 44, virtual drivers 45, and other virtual data 46. Other examples include a virtual control unit 48 including a virtual processing unit 49, a virtual display 50, a virtual printer 52, and a virtual I/O 54. Although some examples of virtual interfaces and resources are provided, any virtual resource or interface may be defined.

A program or programmer corresponding to a particular platform 56, 58, or 60 may provide a transform mechanism 14, 16, or 18 to the source-level virtual machine 10. The transform mechanism 14, 16, or 18 may interact with the virtual source code specification 12 to be transformed into an executable application or program 34, 36, or 38 that is particular to the respective platform 56, 58, or 60. Each of the respective platforms 56, 58, and 60 includes resources 57, 59, and 61 corresponding to the resources defined by the source-level virtual machine 10, such as memory, a control unit, a display, a printer, and I/O. The transform mechanisms 14, 16, and 18 interact with the virtual source code specification 12 to generate the executable applications 34, 36, and 38 utilizing the resources 57, 59, and 61, respectively. After the executable applications 34, 36, and 38 are generated, the virtual source code specification 12 may remain unchanged and platform-neutral, while the transform mechanism 14, 16, or 18 is changed into the executable application 34, 36, or 38. Alternatively, executable application 34, 36, or 38 may be software that is generated as a new piece of software by the transform mechanism 14, 16, or 18, and the virtual source code specification 12, instead of being the result of a transformation of the transform mechanism 14, 16, or 18.

Figure 3:
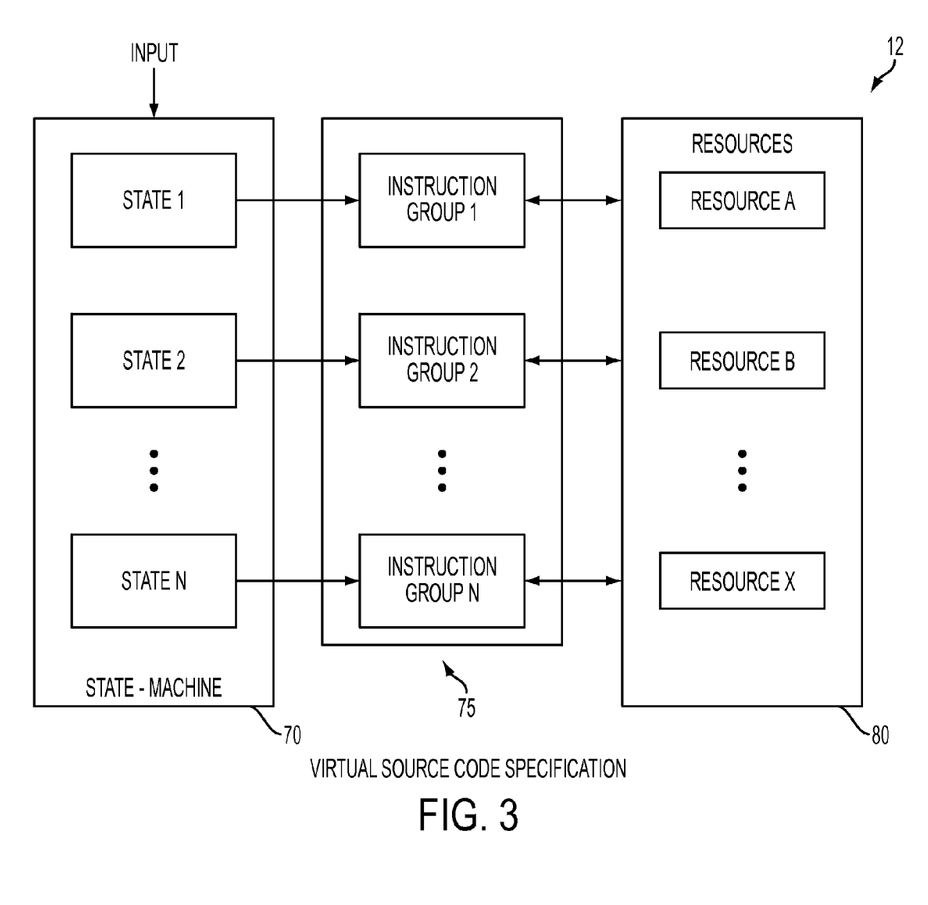
FIG. 3 depicts a block diagram representing a virtual source code state machine according to an embodiment of the present invention.

FIG. 3 illustrates a state-machine aspect of the virtual source code specification 12. The virtual source code specification 12 includes a virtual state machine 70 including a plurality of states (state 1, state 2 . . . state N). The virtual state machine 70 includes rules to generate instructions 75 (instruction group 1, instruction group 2 . . . instruction group N) based on results of tests on input data. The instructions 75 are executed over resources 80 (resource A, resource B . . . resource X), and the resources 80 may provide inputs to the instructions 75.

Figure 4:
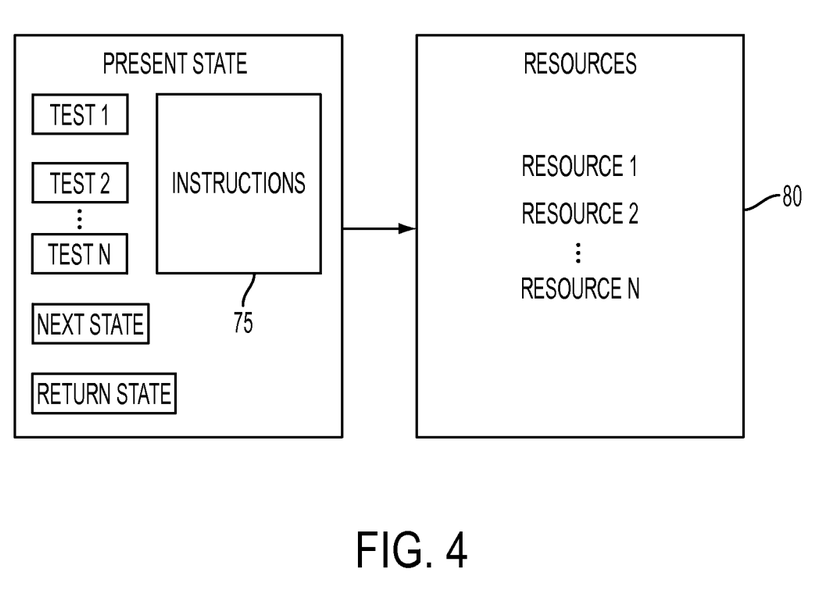
FIG. 4 depicts one state of a state diagram according to an embodiment of the present invention.

FIG. 4 represents a state of the virtual state machine 70 in further detail. The state illustrated in FIG. 4 (PRESENT STATE) represents any one of the states (state 1, state 2 . . . state N) that may occur in the virtual state machine 70. Each state tests input data with one or more tests (test 1, test 2 . . . test N). Upon a positive result, the state includes information to execute instructions 75 with one or more of the resources 80. Each state includes information about a next state when one or more of the tests is successful, and a return state for when none of the tests is successful.

In one embodiment of the present invention, each application is implemented as a virtual source code specification 12. The virtual source code specification 12 may be an XML document that describes a state machine containing a set of states and transitions that act upon an input stream to produce an output stream. Each state performs one or more tests on the current input and executes a set of virtual instructions over common virtual resources for any successful test. A platform-specific target code 22, 24, or 26 is generated when a transform mechanism 14, 16, or 18 is applied to the virtual source code specification 12. In one embodiment, the transform mechanism is an XSL style sheet containing templates with the platform-specific implementation details. Each style sheet may be tailored to a separate platform to generate the application embodied by the virtual source code specification 12 on a separate platform as a platform-specific executable application 34, 36, or 38.

In one embodiment, although the platform-specific executable application is written in a high-level language, such as C or PL/1, the platform-specific executable applications 34, 36, and 38 are structured to be very flat, similar to an assembler application. For example there may be few sub-routines, or none, and there may be no classes or objects utilized in the platform-specific executable application 34, 36, and 38.

According to some embodiments, the source-level virtual machine 10 is implemented in a cloud computing environment. It is understood that although this disclosure includes embodiments executed in a cloud computing environment, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models Are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models Are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
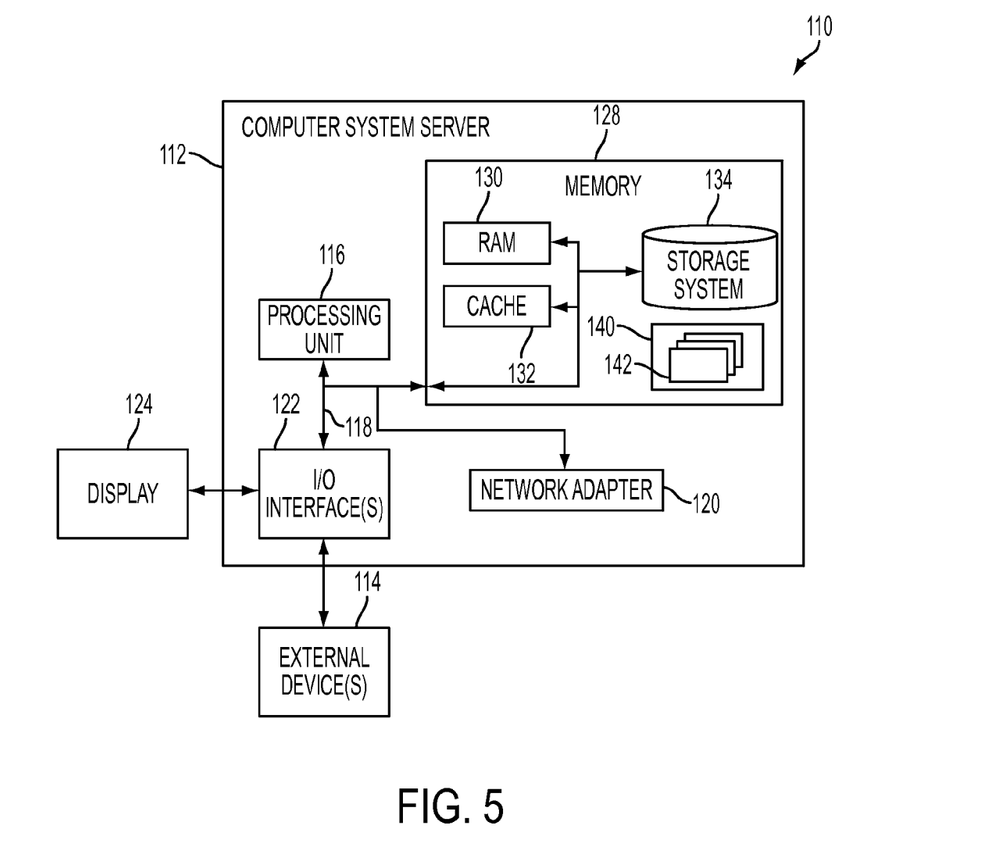
FIG. 5 depicts a cloud computing node according to an embodiment of the present invention.

Referring now to FIG. 5, a schematic of an example of a cloud computing node is shown. Cloud computing node 110 is only one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 112 in cloud computing node 110 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

In one embodiment, the virtual source code specification 12 is stored in memory 128. An external device 114 connected to the computer system server 112 via the I/O interface 122 provides to the computer system server 112 a transform mechanism 14, 16, or 18. The processing unit 116 applies the transform mechanism 14, 16, or 18 to the virtual source code specification 12 to generate high-level language source code 22, 24, or 26 corresponding to a desired executable application on a particular platform. The processing unit 116 may run a compiler program stored in memory 128 to compile the high-level language source code 22, 24, or 26 to generate a platform-specific executable program 34, 36, or 38, and the computer system server 112 may transmit the platform-specific executable program 34, 36, or 38 to either the external device 114 from which the transform mechanism 14, 16, or 18 was received, or to another external device 114.

Alternatively, the computer system server 112 may transmit the high-level language target source code 22, 24, or 26 to an external device 114 to compile the high-level language target source code 22, 24, or 26 to generate the respective platform-specific executable program 34, 36, or 38.

Figure 6:
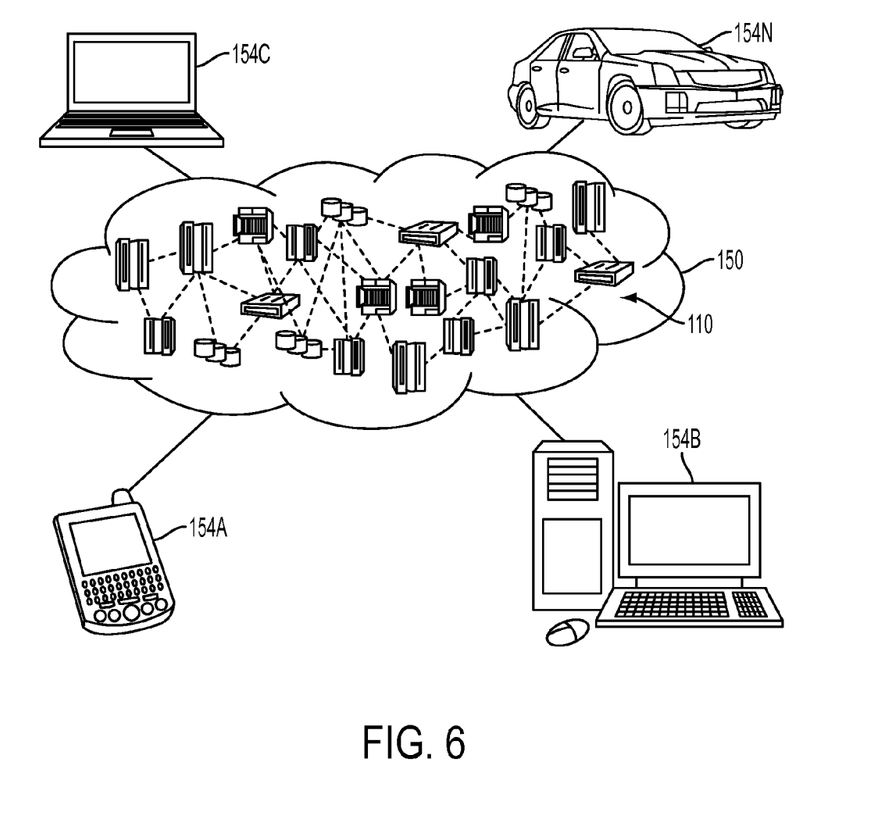
FIG. 6 depicts a cloud computing environment according to an embodiment of the present invention.

Referring now to FIG. 6, an illustrative cloud computing environment 150 is depicted. As shown, cloud computing environment 150 comprises one or more cloud computing nodes 110 with which local computing devices used by cloud consumers, such as, for example, personal digital assistant (PDA) or cellular telephone 154A, desktop computer 154B, laptop computer 154C, and/or automobile computer system 154N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 154A-N shown in FIG. 6 are intended to be illustrative only and that computing nodes 110 and cloud computing environment 150 can communicate with any type of computerized device over any type of network and/or network addressable connection (e.g., using a web browser).

In one embodiment, any one of the computing devices 154A-N may transmit to the cloud computing node 110 a transform mechanism 14, 16, or 18 and receive from the cloud computing node 110 either a high-level language target source code 22, 24, or 26 to be compiled, or a platform-specific executable program 34, 36, or 38 capable of being executed by the respective computing device 154A-N, even when the respective computing devices each operate on different hardware and software platforms.

Figure 7:
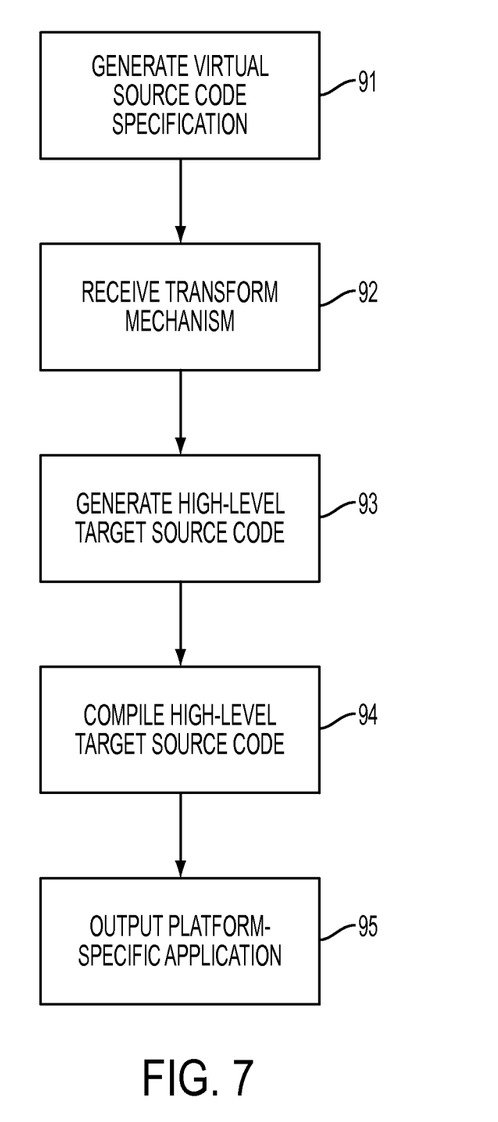
FIG. 7 is a flow diagram of a method of generating an application according to an embodiment of the present invention.

FIG. 7 is a flowchart illustrating a method of generating a platform-specific application according to one embodiment. In operation 91, a virtual source code specification is generated. The virtual source code specification may be a state machine describing rules to use virtual resources upon the success of tests on input data, as discussed above. The virtual source code specification may be generated by a human developer, by a computer program, or by any other means. In operation 92, a transform mechanism or virtual instruction set is received. The transform mechanism is designed to correspond to a particular platform. In operation 93, a high-level target source code is generated by transforming the transform mechanism with the virtual source code specification. The high-level target source code corresponds to the particular platform of the transform mechanism.

In operation 94, the high-level target source code is compiled into a platform-specific application, and in operation 95, the platform-specific application is output. The platform-specific application corresponds to the platform of the transform mechanism. In one embodiment, the virtual source code specification is stored in a first computer or computer system and each of the operations 91-95 is performed by the first computer or computer system. However, in alternative embodiments, the operations of compiling the high-level target source code 94 and outputting the platform-specific application 95 may be performed by a second computer. For example, if the transform mechanism is provided in operation 92 by a user or program from a second computer, in one embodiment the first computer may output the high-level target source code to the second computer, and the second computer may compile the high-level target source code in operation 94.

Figure 8:
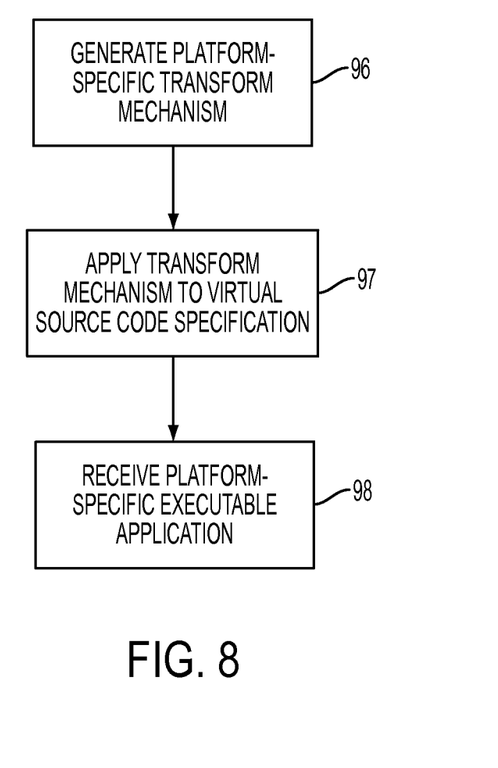
FIG. 8 is a flow diagram of a method of generating an application according to another embodiment of the present invention.

FIG. 8 illustrates an operation to receive a platform-specific executable application according to one embodiment. In operation 96, a platform-specific transform mechanism is generated. In operation 97, the platform-specific transform mechanism is applied to a virtual source code specification. The virtual source code specification is an abstract and platform-neutral state machine describing an application. In operation 98, a platform-specific executable application is received based on the combination of the virtual source code specification and the platform-specific transform mechanism. As discussed above with respect to FIG. 7, in some embodiments, a platform-specific high-level target source code may be received and compiled to generate the platform-specific executable application.

According some embodiments, an abstract virtual machine provides isolation for a virtual source code specification from any particular platform. The virtual source code is an application in the form of a state machine that is not tailored to any particular platform. A user or program associated with a particular platform may provide a virtual instruction set or transform mechanism corresponding to a particular platform, and the user or program may custom-tailor the virtual instruction set or transform mechanism for the best possible performance on the particular platform. The majority of the application may be embodied in the virtual source code specification, which remains unchanged as the virtual instruction sets or transform mechanisms generate programs for particular platforms. Since only the virtual instruction sets or transform mechanisms change to generate platform-specific executable programs, less programming resources are required than if the entire virtual instruction set were to be changed. Transforming the virtual instruction set or transform mechanism into a target code and then compiling and linking the target code effectively eliminates any runtime overhead of a conventional virtual machine, which may act as an intermediary between an application and a platform to run the application on the platform. Instead, the virtual source code specification may act as a programming model for a developer, and the virtual source code specification does not need to be accessed once the platform-specific executable program is generated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer program product, comprising:
    a non-transitory computer readable storage medium having computer readable instructions stored thereon, that when executed by a computer, implement a platform-neutral virtual source code specification to interact, respectively, with a plurality of transform mechanisms, each transform mechanism corresponding to a different platform, to generate a plurality of target source codes corresponding respectively to each different platform,
    wherein the virtual source code specification comprises a generic markup document, and each of the plurality of transform mechanisms comprises an instruction set,
    wherein the virtual source code specification includes a virtual state machine having a plurality of states, each having one or more rules to generate a plurality of instruction groups associated with a respective state among the plurality of states, and the virtual source code specification including one or more virtual resources for executing the plurality of instructions, and
    wherein the plurality of instruction groups are transformed by the transform mechanism into the plurality of target source codes corresponding respectively to each different platform.

2. The computer program product of claim 1, further comprising:
    a compiler to compile the plurality of target source codes to generate a plurality of platform-specific executable applications corresponding respectively to each different platform.

3. The computer program product of claim 2, wherein the virtual state machine is configured to receive input data, to perform at least one test on the input data, and to execute at least one virtual instruction on a virtual resource when the at least one test is successful.

4. The computer program product of claim 3, wherein the plurality of executable applications are configured to execute an actual instruction on an actual resource of the respective different platforms corresponding to the virtual instruction and the virtual resource.

5. The computer program product of claim 2, further comprising:
    a virtual platform defining virtual resources including virtual hardware and a virtual operating system,
    wherein the virtual source code specification is programmed based on the virtual platform.

6. The computer program product of claim 5, wherein the plurality of executable applications is configured to access actual resources respectively on each different platform corresponding to the virtual resources defined in the virtual platform.

7. The computer program product of claim 1, wherein the virtual source code specification comprises an XML document, and each of the plurality of transform mechanisms comprises an XSL style sheet.

8. The computer program product of claim 1, wherein the virtual source code specification is located on a server in a cloud of a cloud computing environment, and
    the plurality of transform mechanisms are received from computers located outside the cloud.

9. A method of generating code, comprising:
    generating, with a computer, a transform mechanism corresponding to a particular platform; and
    applying the transform mechanism to a virtual source code specification that does not correspond to the particular platform to generate a target source code corresponding to the particular platform,
    wherein the virtual source code specification comprises a generic markup document, and each of the plurality of transform mechanisms comprises an instruction set,
    wherein the virtual source code specification includes a virtual state machine having a plurality of states, each having one or more rules to generate a plurality of instruction groups associated with a respective state among the plurality of states, and the virtual source code specification including one or more virtual resources for executing the plurality of instructions, and
    wherein the plurality of instruction groups are transformed by the transform mechanism into the plurality of target source codes corresponding respectively to each different platform.

10. The method of claim 9, further comprising:
    compiling the target source code to generate an executable application corresponding to the particular platform.

11. The method of claim 9, wherein the virtual state machine is not particular to any particular platform.

12. The method of claim 9, wherein the virtual source code specification comprises an XML document and the transform mechanism comprises an XSL style sheet.

13. The method of claim 9, wherein generating the transform mechanism includes generating a plurality of transform mechanisms, each corresponding to a different platform, and
    applying the transform mechanism to the virtual source code specification includes respectively applying each of the plurality of transform mechanisms to the virtual source code specification to generate a respective plurality of target source codes, each target source code corresponding to a different platform.

14. A method of generating code, comprising:
    receiving, by a computer, a transform mechanism corresponding to a particular platform; and applying the transform mechanism to a virtual source code specification that does not correspond to the particular platform to generate a target source code corresponding to the particular platform, wherein the virtual source code specification comprises a generic markup document, and each of the plurality of transform mechanisms comprises an instruction set, wherein the virtual source code specification includes a virtual state machine having a plurality of states, each having one or more rules to generate a plurality of instruction groups associated with a respective state among the plurality of states, and the virtual source code specification including one or more virtual resources for executing the plurality of instructions, and wherein the plurality of instruction groups are transformed by the transform mechanism into the plurality of target source codes corresponding respectively to each different platform.

15. The method of claim 14, further comprising:
compiling the target source code to generate an executable application corresponding to the particular platform.

16. The method of claim 14, wherein receiving the transform mechanism includes receiving a plurality of transform mechanisms, each corresponding to a different platform, and
applying the transform mechanism to the virtual source code specification includes respectively applying each of the plurality of transform mechanisms to the virtual source code specification to generate a respective plurality of target source codes, each target source code corresponding to a different platform.

17. A system comprising:
a first computer including memory having stored therein a virtual source code specification of an application corresponding to no particular platform and at least one transform mechanism corresponding to a particular platform and configured to be applied, by a processor, to the virtual source code specification to generate a source code corresponding to the particular platform, wherein the virtual source code specification comprises a generic markup document, and each of the plurality of transform mechanisms comprises an instruction set, such that applying a first instruction set to the generic markup document generates a first target source code corresponding to a first platform, and applying a second instruction set to the generic markup document generates a second target source code corresponding to a second platform different from the first platform.

18. The system of claim 17, further comprising a compiler to compile the source code to generate an executable application corresponding to the particular platform.

19. The system of claim 18, wherein the transform mechanism is generated in a second computer operating on the particular platform and is transmitted to the first computer, the compiler is located in the first computer, and the first computer is configured to transmit the executable application corresponding to the particular platform to the second computer.

20. The system of claim 18, wherein the transform mechanism is generated in a second computer operating on the particular platform and is transmitted to the first computer, the first computer is configured to transmit the source code to the second computer, and the second computer includes the compiler to generate the executable application corresponding to the particular platform.

* * * * *